United States Patent [19]

Thirlby

[11] 4,129,957
[45] Dec. 19, 1978

[54] FISHING BAIT HARNESS, FISHING LURE, AND ATTACHMENT MEANS

[75] Inventor: Thomas E. Thirlby, Traverse City, Mich.

[73] Assignee: Edward W. TenHouten, Cadillac, Mich. ; a part interest

[21] Appl. No.: 743,138

[22] Filed: Nov. 19, 1976

[51] Int. Cl.² .................. A01K 85/00; A01K 83/06
[52] U.S. Cl. ........................ 43/42.49; 43/44.2
[58] Field of Search .............. 43/42.49, 44.2, 44.8, 43/43.1, 44.4, 44.6, 44.98, 42.5, 43.13, 42.22, 42.23

[56] References Cited

U.S. PATENT DOCUMENTS

| 570,687 | 11/1896 | Stanley | 43/42.49 |
|---|---|---|---|
| 1,897,109 | 2/1933 | Bobo | 43/42.49 X |
| 1,898,200 | 2/1933 | Medlin | 43/42.5 X |
| 2,522,073 | 9/1950 | Trada | 43/44.8 X |
| 2,755,593 | 7/1956 | Thurman | 43/44.2 |
| 2,765,574 | 10/1956 | Martin | 43/44.4 |
| 2,927,393 | 3/1960 | Flamisch et al. | 43/44.2 |
| 2,945,318 | 7/1960 | Lassiter | 43/42.49 X |
| 2,974,436 | 3/1961 | Gourlay | 43/44.4 |
| 3,956,847 | 5/1976 | Bayes | 43/42.49 X |

FOREIGN PATENT DOCUMENTS 483262   4/1938   United Kingdom ............ 43/44.2

Primary Examiner—Clifford D. Crowder
Attorney, Agent, or Firm—Lon H. Romanski

[57] ABSTRACT

A bait harness structure is shown as having: (a) a relatively forwardly disposed portion, which is disposed at an angle inclined with respect to the vertical, for securing thereto suitable loop-like attachment means by which a related fishing line can be secured to the harness structure; (b) a relatively rearwardly disposed portion also inclined with respect to the vertical and effective for carrying a fishing hook thereon; and (c) a forward upwardly directed bait impaler and a rearward upwardly directed bait impaler inclined toward each other and effective to secure thereto, as by impaling, related bait whether of the natural or artificial type. The configuration of the forward disposed portion can be functionally altered as by the operative attachment thereto of any selected spoon-like member.

16 Claims, 16 Drawing Figures

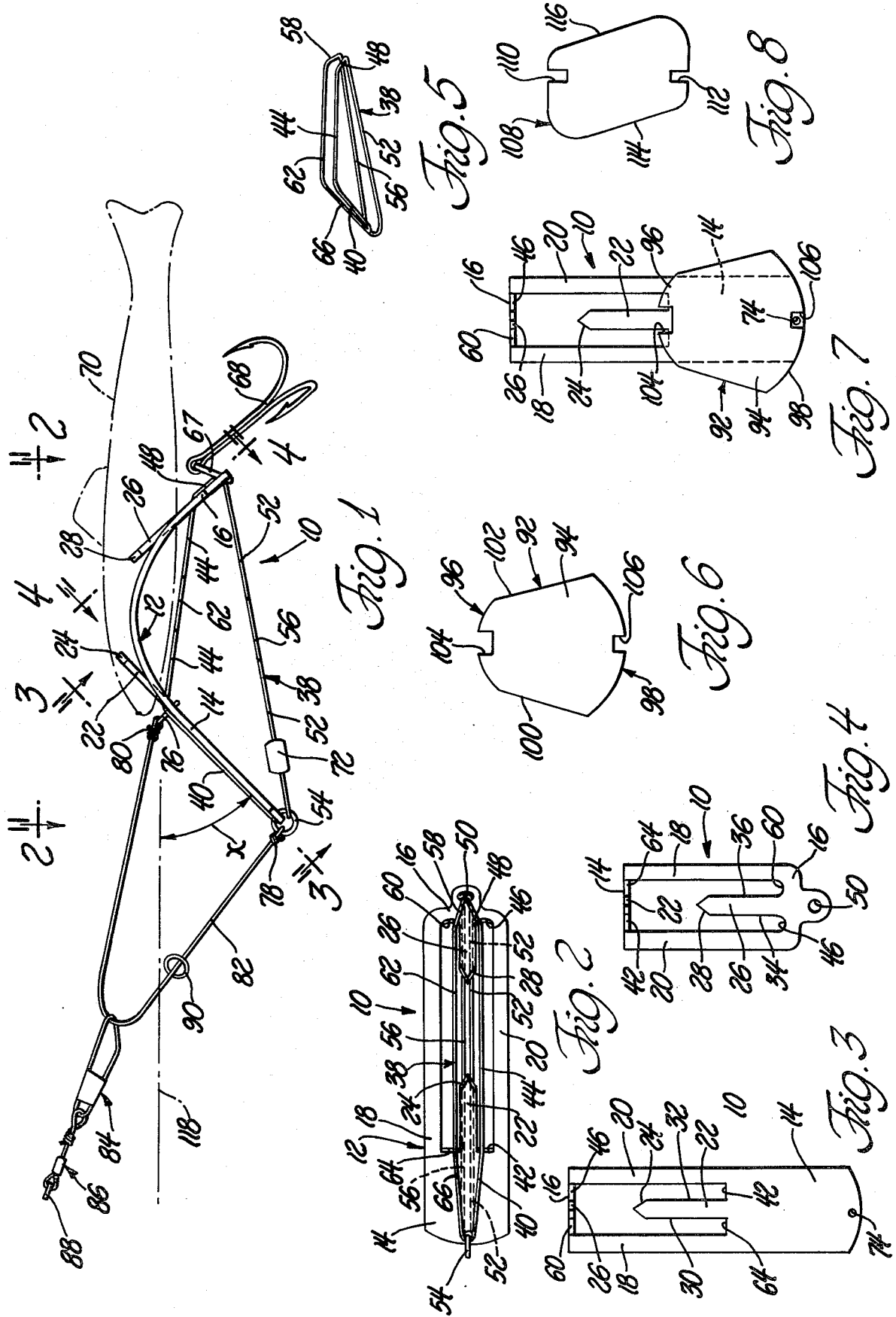

FISHING BAIT HARNESS, FISHING LURE, AND ATTACHMENT MEANS

BACKGROUND OF THE INVENTION

The prior art has heretofore proposed a multitude of differing forms of bait holders and lures. However, all of such prior art devices have certain important shortcomings.

Generally, any consistently successful fishing bait holder and/or lure must exhibit action while passing through the water. By "action" is meant that the bait, being drawn through the water, must have side-to-side movement, as well as preferably some up-and-down movement in order to closely imitate a swimming movement to thereby attract the fish in the vicinity.

In prior art lures and bait harnesses, a single eye-type anchor is usually provided near or at the forward end thereof and the same said forward end is either shaped or provided with a blade-like protuberance. The fishing line is secured to the single eye type anchor and while the lure or bait harness is drawn through the water by the fishing line the blade-like protuberance or the contour of the said forward end reacts against the water and causes some oscillating type motion to occur in the lure and/or bait harness. At first impression this appears to fulfill the general requirements of a suitable fishing lure and/or bait harness. However, experience shows that such prior art devices are not satisfactory.

For example, because sometimes the blade-like protuberance, the contour of the said forward end and/or the location of the eyelet means for towing the prior art devices are not in proper alignment with the remainder of the device, the desired oscillating type of motion of the lure or bait harness, during its use, is unattainable because the reaction forces of the water thereagainst often cause the device to assume either a generally stable attitude or one which is excessively erratic thereby failing to attract fish.

Another problem exhibited by the prior art devices employing blade-like protuberances is that such protuberances have a propensity for becoming caught by debris in the water as well as in and by forms of marine plant life often resulting in the associated fishing line becoming broken with the attendant loss of the lure or bait harness.

Another problem exhibited by the prior art devices is the unability thereof to assume and maintain the optimum attitude at various depths of water. That is, by way of background, it is known that there is temperature stratification in lakes and that the vertical or relative elevational locations of such respective strata change as during the calendar seasons as well as with respect to the depth profile of the body of water. Further, prolonged seasonal hot or cold spells also provide an influencing factor in the relative location of such strata. It is also known that the various species of fish exhibit varying preferences as to water temperature and such will usually seek the particular level or stratum in the lake which will provide the preferred water temperature. This, in turn, means that one will usually have to take steps in order to have the lure or bait harness being employed move along that particular temperature stratum which the fished-for species prefers. Since such a stratum may, as already described, vary in elevational location during the calendar seasons and as between different lakes, weights are often selectively added to either or both the lure (and/or bait harness) and the fishing line employed for towing such. It should be remembered that the prior art devices, because of their construction, especially with artificial lures, respectively exhibit a particular buoyancy and because of their contours they exhibit particular reactional forces against the water through which they pass. Generally, each of the prior art lures will have, inherently, a particular level or elevation within the lake or body of water in which it will best function. Unfortunately, such a level inherently best for any particular prior art lure does not usually coincide with the preferred temperature stratum sought by the species of fish being fished-for. Accordingly, with such prior art devices, especially those provided with a single eyelet (or similar means) for securing a towing fishing line thereto, it is accepted practice to secure selected weights (often referred to as split lead shot or sinkers) to the fishing line at a considerable distance forward of the lure or bait harness. This may appear to be a perfectly acceptable manner in causing the related lure to operate at a selected level within the water. However, it has been discovered that because of the force vectors involved in towing such an additionally weighted prior art lure, the lure is caused to assume an attitude within the water which is not conducive to it providing the desired action or motion within such water as it is being towed therethrough. That is, the lure, because of the increased length of fishing line, when fishing at greater depths, will usually assume a rather inclined attitude with either the forward or rearward most portion of the lure being at a slightly higher elevation depending on the configuration of the lure. This occurs even though the path of travel of the prior art lure may be in a plane generally parallel to the surface of the body of water. Consequently, the angle of attack of the forward most portion of the lure, with respect to the water through which it is passing, becomes sufficiently altered from its intended design angle as to seriously impair if not totally eliminate the intended desired oscillatory motion or action of such lure.

Accordingly the invention in its several aspects herein disclosed and claimed is primarily directed to the solution of the preceding and other attendant problems.

SUMMARY OF THE INVENTION

According to one aspect of the invention, a lure or bait harness or holder is provided with at least two forwardly situated eyelet or anchor means which are effective to have secured thereto sling-like attachment means by which a related fishing line can be operatively secured to the lure, bait harness or bait holder. In such aspect of the invention the sling-like attachment means also makes it possible for the fishing line to be so secured thereto as to have the end of such line generally translationally moveable with respect to the lure, harness or holder.

In another aspect of the invention, the sling-like attachment means is so positioned relative to the lure, harness or holder as to effectively provide for a ramp like or deflector action with respect to debris in the water or any marine plant life.

In still another aspect of the invention, adapter means become effective to adapt prior art devices to the practice of the invention.

Yet another aspect of the invention enables the selective alteration of the action or motion imparted to the lure, harness or holder by the water as such is drawn or towed therethrough.

Various general and specific objects and advantages of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views:

FIG. 1 is a side elevational view of harness or holder means and attachment means embodying teachings of the invention;

FIG. 2 is a top plan view taken generally on the plane of line 2—2 of FIG. 1 and looking in the direction of the arrows, and with certain of the elements shown in FIG. 1 being omitted;

FIG. 3 is a view taken generally on the plane of line 3—3 of FIG. 1 and looking in the direction of the arrows, and with certain of the elements shown in FIG. 1 being omitted;

FIG. 4 is a view taken generally on the plane of line 4—4 of FIG. 1 and looking in the direction of the arrows, and with certain of the elements shown in FIG. 1 being omitted;

FIG. 5 is a perspective view, in comparatively reduced scale, of one of the elements shown in FIGS. 1 and 2;

FIG. 6 is a generally plan view of a deflector-like element combinable with the structure as shown in, for example, FIGS. 1 and 2;

FIG. 7 is a view similar to that of FIG. 3 and illustrating, generally, one possible configuration of combining the element of FIG. 6 with the structure as shown in FIG. 3;

FIG. 8 is a view generally similar to that of FIG. 6 but illustrating one modified embodiment of such deflector-like means;

FIG. 14 is a view taken generally on the plane of line 14—14 of FIG. 12 and looking in the direction of the arrows;

DETAILED DESCRIPTION OF THE PREFERRED EMBODIMENTS

Figure 9:
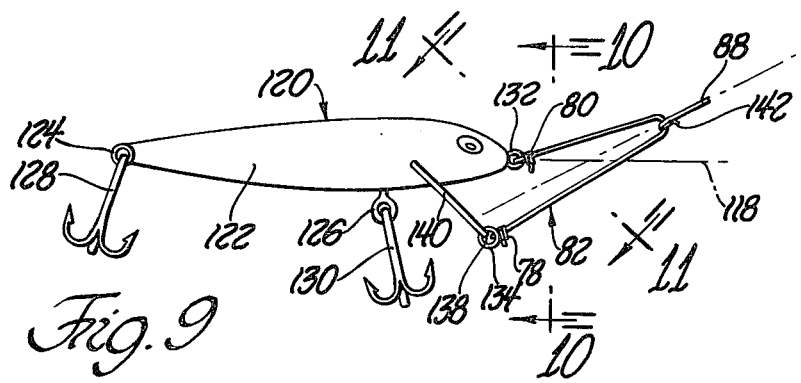
FIG. 9 is a side elevational view of a lure constructed as to embody teachings of the invention.
Figure 10:
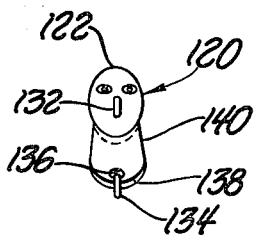
FIG. 10 is a view taken generally on the plane of line 10—10 of FIG. 9 and looking in the direction of the arrows.
Figure 11:
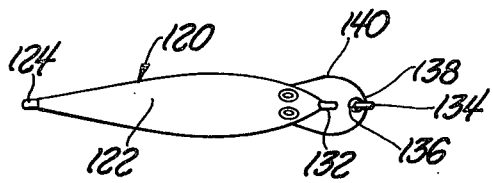
FIG. 11 is a view taken generally on the plane of line 11—11 of FIG. 9 and looking in the direction of the arrows.

Referring now in greater detail to the drawings, FIGS. 1–4 illustrate a bait holder or harness means 10 as comprising a generally bowed planar-like body 12 which has a forwardly disposed body portion 14 and a rearwardly disposed body portion 16 which are operatively joined to each other by band-like bridging members or portions 18 and 20 each integrally formed with such body portions 14 and 16.

Formed preferably integrally with the forward disposed body portion 14 is a first bait or artificial lure securing means 22 which, in the form illustrated, comprises impaling means. As shown, such securing and/or impaling means 22 has an upper end 24 preferably directed upwardly and rearwardly relative to the forward body portion 14. Such end 24, as illustrated, may be pointed as to enhance the impaling qualities thereof. Similarly, preferably integrally formed with the rearwardly disposed body portion 16 is a second bait or artificial lure sucuring means 26 which, in the form illustrated, comprises impaling means. As shown, such securing and/or impaling means 26 has an upper end 28 preferably directed upwardly and forwardly relative to the rearward body portion 16. Such end 28, as illustrated, may be pointed as to enhance the impaling qualities thereof. If desired, although not specifically illustrated the side edges 30 and 32 of retainer or impaler 22 and side edges 34 and 36 of retainer or impaler 26 may be generally of barbed or serrated-like configuration as to thereby enhance the bait or lure retaining qualities thereof. Even though the body 12 may be formed of any suitable material, it is contemplated that such would preferably be formed of plastic material or lightweight non-corrosive metal many specific types of which are obviously suitable. Further, in the embodiment shown in FIGS. 1–4, it is contemplated that the body 12 be made of relatively resiliently deflectable plastic or metal material which is of generally planar or sheet-like configuration having a relatively thin cross-sectional thickness. As shown best in FIG. 1, body 12 is bent into a bowed configuration as by placing most of the bending within the joining struts 18 and 20. In thusly bowing the body 12, the cut-out impalers 22 and 26 automatically assume the respective depicted positions which describe a very effective securing configuration.

As shown in FIGS. 1, 2 and 5, body 12 is provided with body-retaining cord-like means 38 which, among other things, serves to maintain body means 12 in the selected bowed configuration. The cord-like or wire-like means 38 may be formed of any suitable material as, for example and not by way of limitation, nylon metal, solid plastic or Dacron ("Dacron" being a Registered U.S. Trademark of the E. I. duPont de Nemours & Co. for a polyester fiber made from polyethylene terephthalate). In any event, the cord or retainer means 38 may be considered as comprising several discernible portions or sections. For example, in the embodiment illustrated, cord means 38 comprises a first portion or section 40 lying along the outer or upper surface of forward body portion 14 and passing over the bight portion 42 between impaler 22 and strut 20 from where a portion 44 extends rearwardly and bridges the space generally between bight portion 42 and bight portion 46 between impaler 26 and strut 20. The cable or cord means 38 then continues as a section 48 generally downwardly along the outer or upper surface of rearward body portion 16 and then passes through an aperture 50, formed in body portion 16, from where it extends generally forwardly as a section 52 which, in turn is looped through a ring member 54 and extends rearwardly as a section 56 which again passes through aperture 50 and, as a section or portion 58, lies along the outer or upper surface of rearward body portion 16 and extends upwardly passing over a bight portion 60 between impaler 28 and strut 18. The cable or cord means 38 continues and extends forwardly as a portion 62 and bridges the space generally between bight portion 60 and a bight portion 64 between impaler 22 and strut 18 and then as a portion 66 lies along the outer or upper surface of forwardly disposed body section 14 where it extends downwardly passing through ring or retainer 54 and joins cable portion 40 as to effectively complete a circuitous loop.

A retainer member or ring 67 is operatively generally pivotally secured to rearward body section 16 as by passing through aperture 50. Preferably, cord or cable means 38 when passing through aperture means 50 is also threaded through the opening of retainer ring 67. As illustrated, the ring 67 is effective to operatively carry related fish hook means 68 which, if desired, may be swung generally upwardly to at least partially imbed the barbed portions thereof within the associated lure 70, shown in phantom line, whether such lure be natural or artificial.

As also shown, the lower disposed bridging-like cable portions 52 and 56 provide means for carrying selectively attached weight means such as the split lead shot typically illustrated at 72. Many different forms and configurations of cord means functionally equivalent to means 38 will, of course, be apparent in view of the disclosure herein made and it should be clear that the practice of the invention is not limited to the precise cord means 38 shown.

As is best seen in FIG. 1, the related real or artificial bait 70 may be easily secured to body 12 as by merely impaling such onto impalers 22 and 26 which, preferably, are formed of relatively resiliently deflectable material. It should be apparent that by grasping the lower or outer-most ends of forward and rearward body sections 14 and 16 and then pressing or deflecting such sections 14 and 16 generally toward each other, impalers 22 and 26 generally translate as to move toward positions more nearly parallel to each other. At such time, of course, it becomes a simple matter to impale bait means 70 onto the more nearly parallel impalers 22 and 26 and then releasing such body sections 14 and 16 permitting their return to that generally depicted in FIG. 1 and simultaneously causing the impalers 22 and 26 to return to the generally inclined positions illustrated thereby effectively locking the bait means 70 onto the body 12 and generally aligned with the space between struts 18 and 20.

Even though the body 12 has been disclosed as being relatively resiliently deflectable and tending to normally assume a flat configuration (such tendency being prohibited by the cord means 38), it is also contemplated that such body means 12, although made of resiliently deflectable material, could be molded as to have its normal configuration the bowed configuration depicted in FIG. 1. In such event, it is, of course, conceivable that the cord means 38 as shown could be considerably altered and very possibly eliminated.

The retainer ring or anchor means 54 may be operatively secured to body means 12 as by being received through cooperating aperture means 74 formed in the forwardly situated body section 14. A second ring or anchor means 76 is operatively secured to the generally upper portion of forward body section 14. Although such anchor means 76 may be secured as through aperture means similar to 74, the anchor means 76 depicted is shown as a ring having an inner diameter sufficient to accommodate its passage about impaler 22 as to generally slidingly abut as against bight portions 64 and 42.

As can be seen, the anchor means 54 and 76, in turn, are respectively connected to opposite ends 78 and 80 of attachment means 82 which is formed in a loop or sling-like configuration. The attachment means 82 is illustrated as being relatively flexible; however, it is possible that such means 82 could be formed of a rigid material. Further, attachment means 82 may be made of any suitable material as, for example, and not by way of limitation, flexible strands of metal, nylon or "Dacron". The attachment means or member 82 is illustrated as being connected to a clip-like connector 84 having swivel means 86 in turn operatively secured to a related fishing line 88. Preferably, attachment member 82 is provided with an additional ring-like member 90 which may serve as intermediate connecting means for operatively connecting related fishing line means to the attachment member 82.

FIG. 6 illustrates one form of a deflector or action-providing spoon member 92. In the embodiment illustrated, spoon member 92 comprises a flat-like body 94 having upper and lower ends 96 and 98 which may be arcuately contoured in peripheral configuration. The arcuate configuration of the upper end 96 is of a radius less than that of the arcuate configuration of the lower end 98. In the embodiment shown, the side edges 100 and 102 are inclined with respect to each other as to be closest-most at the top. Further, upper end 96 is provided with an opening or notch-like recess 104 while the lower end 98 is similarly provided with a cut-out portion or recess 106.

As shown in FIG. 7 and with reference to FIGS. 1, 2 and 5, the spoon 92 may be operatively applied to the forwardly disposed body section 14 in order to thereby create a particular desired reaction against the water and thereby impart the required movement to body means 12 and the bait 70 carried thereby. Such spoon means 92 may, of course, be operatively connected to body section 14 by any suitable means or method. However, in the embodiment illustrated, spoon or reaction means 92 is slipped between cord means portions 40 and 66 and the outer or upper surface of forward body section 14 as to assume a relative position depicted in FIG. 7. With the spoon means 92 in such a position, the lower portions of cord sections 66 and 40 pass through notch 106 to thereby provide for relative transverse stability while the upper portions of cord sections 66 and 40 pass through notch 104 to thereby provide for relative transverse stability of the upper end of spoon means 92.

FIG. 8 illustrates the fact that such spoon means may be of varying configurations. That is, in FIG. 8 the spoon means 108 is not symmetrical about a line passing through upper and lower notches 110 and 112. As can be seen, side edges 114 and 116 are generally parallel to each other while, at the same time, being inclined from the horizontal and vertical. Deflector or spoon means 108, in the configuration depicted, would be detachably secured to the forward body section 14 in the same manner as described with reference to spoon means 92.

Although spoon means 92 and 108 have been described as having upper and lower ends, and also described as being operatively connected to body section 14 as to have such upper ends upwardly disposed and such lower ends downwardly disposed, it should be made clear that the spoon means may be physically reversed both about their respective generally vertical axes as well as about their respective horizontally disposed medial axes. It should also be made clear that even though the spoon means 98 and 108 are described as flat-like in configuration, such may actually be contoured as to have the opposed major surfaces thereof (the surface juxtaposed to body section 14 and the surface reacting against the water) non-parallel to each other to thereby provide for any desired movement effects on the bait 70 while in the water. For example, it is conceivable that such opposed major surfaces could be inclined with respect to each other thereby being effective to vary the angle "X" generally described as between the forward body section 14 and the level of the body of water indicated in FIG. 1 by a line 118 parallel thereto.

FIG. 9 illustrates, typically, artificial lure means 120 embodying teachings of the invention. As generally depicted, the lure means 120 may comprise an elongated body 122 of plastic material with hook anchoring eyelet means 124 and 126 respectively carried at the rear and underside thereof as to, in turn, operatively connect fish hook means 128 and 130 to body 122. Suitable towing anchor eyelet means 132 is carried at the forward end of body 122 while a second towing anchor ring means 134 is preferably secured as through aperture means 136 formed near the lower depending end 138 of a spoon-like plate member 140 which has its upper end suitably fixedly secured to body 122.

Similar to FIG. 1, attachment means 82 is provided as by securing ends 78 and 80 thereof to anchor means 134 and 132, respectively. As generally depicted, fishing line means 88 may be suitably connected, as at 142, to the attachment means 82.

Figure 12:
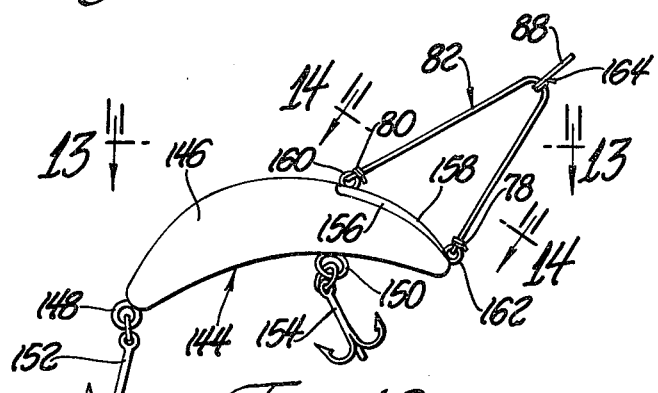
FIG. 12 is a side elevational view of another form of lure constructed as to employ teachings of the invention.
Figure 13:
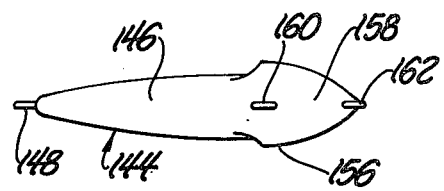
FIG. 13 is a view taken generally on the plane of line 13—13 of FIG. 12 and looking in the direction of the arrows.

FIG. 12 also illustrates, typically, a second form of artificial lure means 144 embodying teachings of the invention. As generally depicted, the lure means 144 may comprise a somewhat elongated and somewhat arcuate body 146 of plastic material with hook anchoring eyelet means 148 and 150 respectively carried at the rear and underside thereof as to, in turn, operatively connect fish hook means 152 and 154 to body 146. As can best be seen in FIGS. 13 and 14, the forward upper portion 156 of body 146 is contoured as to generally laterally extend some distance outwardly beyond the remaining portion of body 146 and thereby define a surface 158 which serves as a deflector means or integrally formed spoon means effective for imparting the desired motion and movement to the lure body 146. Suitable towing anchor eyelet means 160 is carried generally near the upper end of spoon-like deflector means 158 while a second towing anchor eyelet means 162 is carried generally near the lower end of spoon surface means 158.

Similar to FIGS. 1 and 9, attachment means 82 is provided as by securing ends 78 and 80 thereof to anchor means 162 and 160, respectively. As generally depicted, fishing line means 88 may be suitably connected, as at 164, to the attachment means 82.

The basic difference, generically, between the lures of FIGS. 9 and 12 is that in FIG. 9 the action-imparting spoon means 140 is in the nature of an element generally added onto a lure body as to form a surface depending and extending therefrom while in FIG. 12 the action-imparting surface means 158 is in the nature of a surface formed integrally with and generally completing the overall contour or configuration of the lure body.

Figure 15:
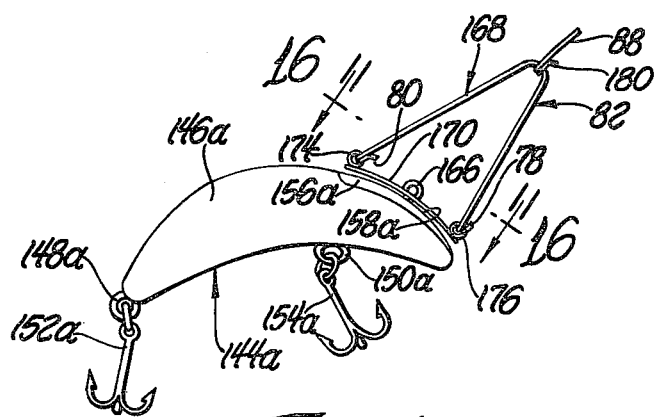
FIG. 15 is a side elevational view of one form of adapter means effective for adapting, for example, prior art lures to the practice of the invention.

FIG. 15 illustrates, in the main, a prior art artificial lure provided with adapter means employing teachings of the invention. Those elements of the lure in FIG. 15 which are like or similar to the lure of FIG. 12 are identified with like reference numbers provided with a suffix "a".

Figure 16:
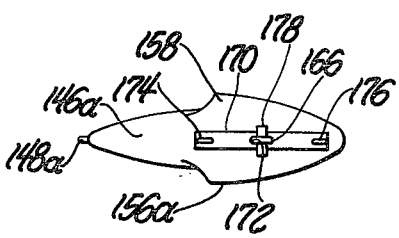
FIG. 16 is a view taken generally on the plane of line 16—16 of FIG. 15 and looking in the direction of the arrows.

As can be seen, the prior art lure body 146a is provided with a single eyelet type anchor means 166 which is generally centrally disposed with respect to and secured above surface 158a. The adapter means 168 is shown as comprising a plate like member 170 which has a slot-like aperture 172 for closely receiving therein the eyelet 166. Additional ring like anchors 174 and 176 are respectively suitably fixedly secured to plate member 170 at generally opposite ends thereof. The plate opening 172 is preferably of a contour closely receiving the eyelet 166 so that the configuration of such eyelet 166 when received therein precludes any substantial relative rotation of plate 170 thereabout as viewed in FIG. 16. Preferably, plate 170 is formed of slightly resilient material and contoured such as to have the ends thereof engage the lure body 146a prior to the middle portion engaging the lure body 146a. Accordingly, by then forcibly depressing such middle portion of plate 170, the aperture of eyelet 166 can be made available for the insertion of suitable locking means as, for example, suitable pin type lock means 178 as shown in FIG. 16. Ends 80 and 78 of attachment means 82 are respectively secured to adapter anchor means 174 and 176 while related fishing line means 88 is operatively connected to attachment means 82 as at 180.

In considering the various aspects and embodiments of the invention as herein disclosed, it should be apparent that the use of looped or sling-like attachment means 82 prevents the related lure, harness or holder assembly from becoming caught in debris or marine plant life within the water.

That is, the lower and upper returns of the sling-like attachment means 82 form an effective wedge like configuration which causes such debris and plant life to be urged generally away from the lure, harness or holder passing through the water. Further, the provision of such sling attachment means 82 enables the associated fishing line to automatically move therealong as to achieve a proper balance of forces and reaction forces and thereby enabling the lure, harness or holder to both maintain its most effective attitude within the water regardless of the depth to which the lure has been made to descend by the addition of weight or sinker means 72.

It should be apparent that such sling attachment means would operate successfully regardless of the inclination of, for example, spoon or action-imparting means 92, 108, 140, 158 and 158a. In fact, such surface means defined thereby may, during use, actually be normal (perpendicular) to the level of the body of water.

The adapter means of FIG. 15 obviously serves to enable the benefits of the reachings of the invention to be realized when using a lure or other similar fishing device of the prior art.

Although only a preferred embodiment and selected modifications of the invention have been disclosed and described it is apparent that other embodiments and modifications of the invention are possible within the scope of the appended claims.

I claim:

1. Apparatus for towing through a related body of water fishing lure means having a relatively forward end and a relatively rearward end, comprising sling-like attachment means operatively secured to said relatively forward end of said lure means, said attachment means comprising a generally elongate flexible body having at least first and second ends, said first end being operatively secured to said relatively forward end of said lure means as to be situated at a relatively higher elevation, said second end being operatively secured to said relatively forward end of said lure means as to be situated at a relatively lower elevation, said elongate flexible body being connectible to related fishing line means at a location generally anywhere along said elongate flexible body between said first and second ends, said elongate flexible body being of an effective length causing said elongate flexible body to form a looped configuration extending a substantial distance forwardly of said first and second ends and a substantial distance forwardly of said relatively forward end of said lure means, said looped configuration defining generally first and second loop leg portions respectively terminating in said first and second ends, said flexibility of said elongate flexible body enabling said looped configuration to undergo changes in configuration whereby said loop leg portions change in length as the point of connection between said fishing line and said elongate flexible body is moved closer to either of said first and second ends thereby automatically compensating for changes in the angle between the direction of movement of said lure means through said related body of water and the direction of a pulling force applied by said fishing line to said elongate flexible body, and said second loop leg portion being positioned forwardly of said relatively forward end of said lure means as to be effective to engage any obstruction in said related body of water forwardly of said relatively forward end of said lure means and cause relative deflection therebetween thereby preventing undesirable snagging as between said obstruction and said lure means.

2. Apparatus according to claim 1 wherein said first and second loop leg portions and said first and second ends are generally in a plane extending generally vertically when said lure means is in its normal operating position in said related body of water.

3. Apparatus according to claim 1 and further comprising ring means contained about said elongate flexible body and slidably moveable therealong between said first and second ends, said ring means being effective for operatively interconnecting said fishing line means to said elongate flexible body.

4. Apparatus according to claim 1 and further comprising adapter means effective to be operatively secured to and carried by said lure means, securing means for securing said adapter means to said lure means, and at least first and second anchor means carried by said adapter means, wherein said first end of said elongate flexible body is operatively connected to said first anchor means, and wherein said second end of said elongate flexible body is operatively connected to said second anchor means.

5. Apparatus according to claim 4 wherein said adapter means comprises an adapter body, aperture means formed in said adapter body for receiving therein a portion of said lure means, and wherein said securing means coacts with said portion of said lure means when received in said aperture means for securing said adapter body to said lure means.

6. Apparatus according to claim 4 wherein said securing means is effective to be selectively disconnected thereby enabling said adapter means to be detached from said lure means while still having said first and second ends connected to said first and second anchor means.

7. A fishing bait holder, for carrying bait in a generally horizontal path through a related body of water comprising a holder body, said holder body comprising a forward body section, a rearward body section spaced from said forward body section, bridging means operatively interconnecting said forward and rearward body sections, bait retaining means carried by said forward and rearward body sections, means for operatively securing fishing hook means to said rearward body section, and sling-like flexible loop attachment means having at least first and second ends operatively secured in spaced relationship to each other to said forward body section, said forward body section being normally inclined with respect to the horizontal during such time as said bait is being carried in said generally horizontal path, said forward body section depending downwardly from said bridging portion, and said first end being connected to said forward body section at a relatively higher elevation while said second end being connected to said forward body section at a relatively lower elevation, said flexible loop attachment means being connectible to related fishing line means and effective to automatically flexibly flex to form an apex-like configuration at the point of connection with said fishing line means as said fishing line means exerts a force thereagainst to tow said flexible loop attachment means and said bait holder through said related body of water.

8. A fishing bait holder according to claim 7 wherein said forward and rearward body sections are both inclined with respect to the horizontal.

9. A fishing bait holder according to claim 8 wherein said forward and rearward body sections are also inclined with respect to each other.

10. A fishing bait holder according to claim 9 wherein said bridging means is bowed as to have the medial portion thereof disposed upwardly at an elevation above said forward and rearward body sections when said holder and bait are in said horizontal path.

11. A fishing bait holder according to claim 10 wherein said bridging means comprises at least first and second relatively narrow elongated bridging members spaced from each other and extending in directions generally parallel to each other with each having their respective opposite ends respectively integrally formed with said forward and rearward body sections.

12. A fishing bait holder according to claim 9 wherein said bait retaining means comprises a first bait retainer integrally formed with said forward body section, and a second bait retainer integrally formed with said rearward body section, said first and second bait retainers extending generally upwardly as to thereby situate the bait at an elevation generally above said forward and rearward body sections.

13. A fishing bait holder according to claim 12 wherein said holder body is resiliently deflectable, wherein said first and second bait retainers are resiliently deflectable relative to each other, and further comprising constraining means maintaining said forward and rearward body sections inclined with respect to each other.

14. A fishing bait holder according to claim 13 wherein said constraining means comprises elongated cordage means a portion of which passes over a forward most surface of said forward body section, and further comprising water deflector-reactor means carried by said forward body section as to be situated generally between said forward most surface and said portion of said cordage means as to be generally constrained therebetween.

15. A fishing bait holder according to claim 13 wherein said constraining means comprises looped cord means looped about and operatively engaging said forward and rearward body sections and extending between outer-most ends of said forward and rearward body sections, said looped cord means also functioning to operatively carry sinker weight means.

16. A fishing bait holder according to claim 7 and further comprising means detachably securable to and selectively positionable along a forward surface of said forward body section as to thereby cause reaction forces to occur while passing through said related body of water resulting in a desired moving action of said holder body.

* * * * *